United States Patent Office 2,769,743
Patented Nov. 6, 1956

2,769,743

PEST CONTROL UTILIZING PESTICIDAL COMPOSITIONS OF PHOSPHORUS

Raymond W. Mattson, Yorba Linda, Calif., assignor to Union Oil Company of California, Los Angeles, Calif., a corporation of California No Drawing. Application April 18, 1952,
Serial No. 283,135

13 Claims. (Cl. 167—30)

This invention relates to pest control, and in particular concerns improved methods and compositions for arresting or preventing the growth of insects and other organisms which are economically or physiologically undesirable. More particularly, it relates to pest control methods and compositions involving the use of certain organic phosphorus compounds as toxic agents. The term "pest control" is employed herein as a generic expression including such terms as insecticide, aphicide, fungicide, germicide, ovicide, larvicide, vermicide, pesticide, and the like.

The organic phosphorus compounds which are employed as active agents in the control of pests according to the invention are diaryl esters of benzene-phosphonous, benzene-phosphonic, or benzene-thiophosphonic acid.

The diaryl esters of benzene-phosphonous acid have the general formula:

$$\langle\!\!\!\bigcirc\!\!\!\rangle\!-\!\!P\!\!\!<\!\!{O-R \atop O-R}$$

wherein R represents an aryl radical. Examples of such esters include di-phenyl benzene-phosphonite, di-p-chlorphenyl benzene-phosphonite, di-p-cresyl benzene-phosphonite, di-o-laurylphenyl benzene-phosphonite, di-o-xenyl benzene-phosphonite, di-naphthyl benzene-phosphonite, di-p-octylphenyl benzene-phosphonite, etc. These esters are formed by reaction between a phosphenyl dihalide and a phenol as illustrated in Examples I and II, below.

The diaryl esters of benzene-phosphonic acid have the general formula:

$$\langle\!\!\!\bigcirc\!\!\!\rangle\!-\!\!\overset{O}{\underset{\|}{P}}\!\!\!<\!\!{O-R \atop O-R}$$

wherein R represents an aryl radical. Examples of such esters include di-phenyl benzene-phosphonate, di-p-chlorphenyl benzene-phosphonate, di-o-cresyl benzene phosphonate, di-p-xenyl benzene-phosphonate, di-naphthyl benzene-phosphonate, di-(2,4-dibromphenyl) benzene-phosphonate, di-p-dodecylphenyl benzene-phosphonate, di-p-isopropylphenyl benzene-phosphonate, etc. These esters are formed by reaction between a phosphenyl tetrahalide and a phenol as illustrated in Examples III and IV, below.

The diaryl esters of benzene-thiophosphonic acid have the general formula:

$$\langle\!\!\!\bigcirc\!\!\!\rangle\!-\!\!\overset{S}{\underset{\|}{P}}\!\!\!<\!\!{O-R \atop O-R}$$

wherein R represents an aryl radical. Examples of such esters include di-phenyl benzene-thiophosphonate, di-(2,4-dichlorophenyl) benzene - thiophosphonate, di - p - bromphenyl benzene-thiophosphonate, di-m-ethylphenyl benzene - thiophosphonate, di - p - laurylphenyl benzene-thiophosphonate, di-naphthyl benzene-thiophosphonate, di-chloroxenyl benzene - thiophosphonate, di-p-cyclohexylphenyl benzene-thiophosphonate, etc. These esters are formed by the direct sulfurization of the corresponding diaryl benzene thiophosphonites as illustrated by Examples V and VI, below.

The following examples will illustrate the preparation of representative members of the present class of diaryl esters which may be employed in the control of pests in accordance with the invention, but are not to be construed as limiting the same. All proportions are in parts by weight.

Example I

Approximately 50 parts of phosphenyl chloride were added dropwise with stirring and gentle heating to 80 parts of p-chlorophenol. Heating at 150°–160° C. with stirring was continued for 1.5 hours, after which the product was fractionally distilled under vacuum. Di-(p-chlorophenyl) benzene-phosphonite, $$(C_6H_5)P(OC_6H_4Cl)_2$$

was obtained as a water-white liquid distilling at 223.5°–226° C./3.1 mm.

Example II

Di-(p-tert.amyl-phenyl) benzene-phosphonite $$(C_6H_5)P(OC_6H_4C_5H_{11})_2$$

was obtained as a viscous water-white liquid distilling at 225°–228° C./3.0 mm. by reaction between phosphenyl chloride and p-tert.amyl-phenol as described in Example I.

Example III

Approximately 1611 parts of phosphenyl chloride were treated with gaseous chlorine at ice-bath temperature until saturation was reached and solid phosphenyl tetrachloride precipitated. The ice-bath was then removed and 3500 parts of p-chlorophenol were added in a thin stream with stirring over a period of 1.75 hours. The mixture was then blown with fuel gas for four hours at a temperature of about 125° C. to remove hydrogen chloride, after which it was distilled to a temperature of 280° C. to complete the removal of hydrogen chloride. By fractionally distilling the crude product under vacuum there was obtained 3177 parts of di-(p-chlorophenyl) benzene-phosphonate, $(C_6H_5)P(O)(OC_6H_4Cl)_2$, as a white crystalline solid having a melting point of about 71°–72° C. and a boiling point of about 243°–247° C./3.3 mm.

Example IV

Di-(p-tert.amyl-phenyl) benzene-phosphonate, $$(C_6H_5)P(O)(OC_6H_4C_5H_{11})_2$$

was obtained as a white crystalline solid melting at 90°–91° C. by reaction between phosphenyl tetrachloride and p-tert.amyl-phenol as described in Example III.

Example V

Di-(p-chloro-phenyl) benzene-thiophosphonate, $$(C_6H_5)P(S)(OC_6H_4Cl)_2$$

was prepared by reaction between free sulfur and di-(p-chloro-phenyl) benzene-phosphonite (Example I). The reaction occurred spontaneously upon mixing of the two reactants, and the product was obtained as a yellow liquid distilling at 242°–254° C./0.7 mm. by fractional distillation of the reaction mixture.

Example VI

Di-(p-tert.amyl-phenyl) benzene-thiophosphonate, $$(C_6H_5)P(S)(OC_6H_4C_5H_{11})_2$$

was obtained as a viscous liquid distilling at 280° C./3.2 mm. by reaction between di-(p-tert.amyl-phenyl) benzene-phosphonite (Example II) and free sulfur as described in Example V.

The diaryl esters of the present class are characterized by having a high degree of toxicity with respect to a variety of pest organisms but at the same time are substantially non-toxic toward plant life. In this respect they differ markedly from the corresponding aliphatic esters, i. e. the dialkyl esters of the present class of phosphorus acids, since the latter, while possessing a substantial degree of pesticidal activity, are highly phytotoxic.

The present class of diaryl esters may be employed in a variety of ways in the control of pest organisms. Inasmuch as they are usually relatively non-volatile liquids or solids, they are well suited for outdoor use in orchard or garden spray compositions. Such compositions may take the form of a simple solution of the compound in a non-phytotoxic solvent such as spray oil. More usually, however, the spray compositions are formulated as aqueous emulsions or dispersions which may contains a wide variety of emulsifying, dispersing or wetting agents, sticking agents, spreaders, and secondary toxic agents, in addition to the organic phosphorus compound. Any of the known procedures for preparing such compositions may be employed, and any of the known wetting agents, detergents, spreaders, etc. may be used in their formulation. In accordance with usual practice, the compositions are conveniently prepared and marketed as concentrates which can be admixed with water at any desired time to obtain the ultimate spray composition. Such a concentrate may comprise, for example, a neutral benzene-phosphonic acid ester and 0.10 percent by weight of the sodium salts of mixed sulfated higher alcohols. Upon mixing one part by weight of this concentrate with 99 parts by weight of water there is obtained an effective emulsion-type insecticidal spray of 1 percent concentration.

The organic phosphorus compounds of the present class may also be absorbed on active or inert carriers, e. g., talc, starch, aluminum silicate, walnut shell flour, etc., to form insecticidal dusting compositions which may also contain other toxic agents such as sulfur, DDT, pyrethrins, nicotine derivatives, etc. Similarly, they may be employed in household sprays in conjunction with other toxic agents such as pyrethrins or rotenone, synergists, active or inert solvents, aerosols, etc. They may also be employed in soil treatment operations.

The following examples will illustrate the use of different phosphorus compounds of the present class in the control of various pest organisms in various ways, but are not to be construed as limiting the invention.

*Example VII*

An ovicidal spray composition was prepared by dispersing 0.5 gallon of di-(p-chlorophenyl) benzene-phosphonite in 100 gallons of water to which had been added four ounces of powdered blood albumen. The latter material served as a dispersing agent or spreader. The resulting dispersion was then sprayed on ripe Valencia oranges which were infested with the eggs of the citrus red mite (*Paratetranychus citri*). Examination of the fruit six days after the treatment showed 100 percent of the eggs to be unhatched. Control fruit which had been sprayed with the aqueous spreader alone showed an egg mortality of only 9 percent. By similar procedure, a dispersion containing 0.25 gallon of the toxic agent per 100 gallons of aqueous spreader was found to effect an egg mortality of 95 percent.

*Example VIII*

A number of the present diaryl esters, along with an analogous dialkyl ester, were tested for phytotoxic effect on tomato, squash and chard plants. In each test a healthy young plant of each type was thoroughly sprayed with an aqueous dispersion containing 1 percent by weight of the toxic agent. Seven days after treatment the plants were examined and the following conditions noted:

| Product Tested | Plant Condition | | |
|---|---|---|---|
| | Tomato | Squash | Chard |
| Di-(p-chloro-phenyl) benzene-phosphonate. | No injury | No injury | No injury. |
| Di-(p-chloro-phenyl) benzene-thiophosphonate. | do | do | Do. |
| Di-(p-tert.amyl-phenyl) benzene-thiophosphonate. | Slight necrosis. | do | Do. |
| Diethyl benzene-phosphonate. | Leaves killed, Tip burn. | Leaves killed, Tip burn. | Spotted necrosis. |

*Example IX*

An aqueous spray composition was prepared by dissolving 2 parts by weight of di-(p-tert.amyl-phenyl) benzene-phosphonite in 3 parts by weight of benzene and dispersing the resulting solution in 100 parts by weight of water containing 0.003 percent by weight of powdered blood albumen. Grapefruit infested with mature citrus red scale (*Aonidiella aurantii*) were sprayed with this composition. Three weeks after the treatment, examination of the fruit showed a 100% mortality of the scale. A similar test carried out with di-(p-tert.amyl-phenyl) benzene-thiophosphonate gave a mortality value of 90.0 percent.

*Example X*

Di-phenyl benzene-phosphonate and di-phenyl benzene-phosphonite were each tested for fungistatic action on *Sclerotina fructicola*.

In carrying out these tests, the toxic agent is dispersed in a dilute sugar solution and then mixed with an equal amount of a nutrient broth culture of the test organism spores. After 24 hours standing at room temperature, the culture is examined under the microscope and an actual count is made to determine the proportion of spores germinating.

| Product Tested | Conc., percent | Condition of Organism |
|---|---|---|
| Di-phenyl benzene-phosphonite | 0.2 | No germination, complete inhibition. |
| Do | 0.1 | Do. |
| Do | 0.05 | 1-5% of spores germinating. |
| Di-phenyl benzene-phosphonate | 0.2 | No germination, complete inhibition. |
| Do | 0.1 | Do. |
| Do | 0.05 | Do. |
| Do | 0.025 | Do. |
| Do | 0.0125 | Do. |

*Example XI*

A number of toxic agents of the present class were tested for insecticidal action against army worm larvae (*Cirphus unipuncta*) as follows: The toxic agent was finely ground and mixed with an equal amount of finely-divided talc. The resulting insecticidal dust was then applied to sections of corn blade, and the dusted sections were placed in petri dishes along with the test larvae. Twenty-four hours later the dishes were examined and a count was made to determine the number of dead larvae.

| Product Tested | Mortality, Percent |
|---|---|
| Di-(p-chloro-phenyl) benzene-phosphonite | 90 |
| Di-(p-chloro-phenyl) benzene-phosphonate | 90 |
| Di-(p-chloro-phenyl) benzene-thiophosphonate | 90 |
| Control | 10 |

The following examples will illustrate the formulation of a number of pest control compositions suitable for use in accordance with the invention, but are not to be construed as limiting the same:

*Example XII*

| | Lbs. |
|---|---|
| Di-p-chlorphenyl benzene phosphonate | 3.50 |
| Attapulgus clay | 1.25 |
| Powdered aluminum silicate | 70 |

The toxic agent and clay are thoroughly mixed in a ball-mill, and the mixture is then blended into the powdered aluminum silicate.

*Example XIII*

| | | |
|---|---|---|
| Di-phenyl benzene phosphonite | lbs | 5.0 |
| Powdered blood albumin | ounces | 4.0 |
| Water | gallons | 100 |

The blood albumin is dispersed in about one-half the quantity of water, after which the toxic agent is stirred in and the resulting composition is diluted with the remaining water.

*Example XIV*

| | | |
|---|---|---|
| Di-p-xenyl benzene thiophosphonate | lbs | 1.0 |
| Benzene | lbs | 5.0 |
| Commercial spreading agent | ounces | 5.0 |
| Water | gallons | 100 |

The composition is prepared as described in Example XII except that the toxic agent is first dissolved in the benzene.

*Example XV*

| | | |
|---|---|---|
| Di-(p-tert. butylphenyl) benzenephosphonate | lb | 1.0 |
| Kerosene | lbs | 20 |
| Aqueous spray oil emulsion (5%) | gallons | 100 |

The toxic agent is dissolved in the kerosene and is then stirred into the aqueous oil emulsion.

*Example XVI*

| | | |
|---|---|---|
| Di-dodecylphenyl benzene-phosphonate | lb | 1.0 |
| Commercial spreading agent | ounces | 4.0 |
| Comercial sticking agent | lbs | 2.0 |
| Cane sugar | lbs | 4.0 |
| Water | gallons | 100 |

The concentration in which the organic phosphorus compounds of the present class are employed in pest control compositions varies widely depending on a number of factors, including the particular compound employed, the type of composition in which it is used, the type of organism being combatted, and the conditions under which the composition is to be used. In general, however, when employed in aqueous emulsion or dispersion form as an orchard or garden spray, it is preferable that the composition contain from about 0.25 to about 5.0 percent by weight of the active agent. Such compositions usually also comprise a small amount, e. g., 0.001–0.5 percent by weight, of a wetting or dispersing agent which not only acts to secure homogeneous dispersion of the toxic agent in the water but also serves to promote good contact between the spray and the foliage or the like being treated. In other types of compositions, for example in dry dusting compositions wherein the toxic agent is absorbed on or diluted with an inert dry carrier, the active agent is usually employed in somewhat higher proportions, e. g., 5 to 25 or more percent by weight. For use in soil treatment or the like, it may be desirable to employ the active agent at full strength or as a relatively concentrated solution in a suitable solvent.

Other modes of applying the principle of my invention may be employed instead of those explained, change being made as regards the methods or materials disclosed provided the steps or compositions stated by any of the following claims or the equivalent of such stated steps or compositions, be employed.

This application is a continuation-in-part of my copending application, Serial No. 47,945, filed September 4, 1948, and now abandoned.

I, therefore, particularly point out and distinctly claim as my invention:

1. The method of protecting living plants from attack by pest organisms which comprises applying to the surface of said plant a toxic amount of a pest control composition containing as an essential active ingredient a compound having the general formula

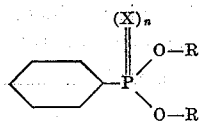

wherein each R represents an aryl radical, X represents a substituent selected from the class consisting of oxygen and sulfur and $n$ represents an integer not greater than 1.

2. The method of claim 1 wherein the pest control composition comprises an aqueous dispersion of said active ingredient.

3. The method of claim 1 wherein the pest control composition consists of an inert dry carrier material having the said active ingredient absorbed thereon.

4. The method of claim 1 wherein the active ingredient is a diaryl benzene-phosphonite having the formula

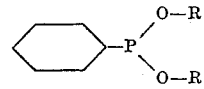

wherein each R represents an aryl radical.

5. The method of claim 1 wherein the active ingredient is a diaryl benzene-phosphonate having the formula

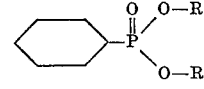

wherein each R represents an aryl radical.

6. The method of claim 1 wherein the active ingredient is a diaryl benzene-thiophosphonate having the formula

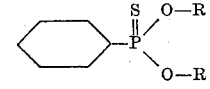

wherein each R represents an aryl radical.

7. The method of claim 1 wherein the pest control composition comprises an aqueous dispersion containing between about 0.25 and about 5 percent by weight of a diaryl benzene-phosphonite having the general formula

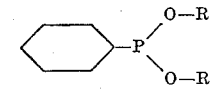

wherein each R represents an aryl radical.

8. The method of claim 1 wherein the pest control composition comprises an aqueous dispersion containing between about 0.25 and about 5 percent by weight of a diaryl benzene-phosphonate having the general formula

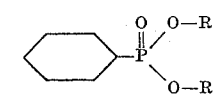

wherein each R represents an aryl radical.

9. The method of claim 1 wherein the pest control composition comprises an aqueous dispersion containing between about 0.25 and about 5 percent by weight of a diaryl benzene-thiophosphonate having the general formula

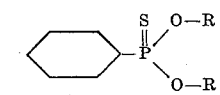

wherein each R represents an aryl radical.

10. The method of claim 7 wherein the active ingredient is di-(p-chlorphenyl) benzene-phosphonite.

11. The method of claim 8 wherein the active ingredient is di-(p-chlorphenyl) benzene-phosphonate.

12. The method of claim 8 wherein the active ingredient is di-(p-tert.amyl-phenyl) benzene-phosphonite.

13. The method of claim 9 wherein the active ingredient is di-(p-chlorphenyl) benzene-thiophosphonate.

References Cited in the file of this patent

UNITED STATES PATENTS

| | | |
|---|---|---|
| 1,921,364 | Lommel et al. | Aug. 8, 1933 |
| 2,004,788 | Green | June 11, 1935 |
| 2,143,639 | Caprio | Jan. 10, 1939 |
| 2,195,696 | Dolman | Apr. 2, 1940 |

OTHER REFERENCES

Ludvik et al.: Journal of Economic Entomology, volume 40, pages 97 to 100 (1947).

Arbuzov: Chemical Abstracts, volume 41, page 6096(g).

Frear: Chemistry of Insecticides, Fungicides and Herbicides, 2d edition, pages 286 and 287, September 1948.